United States Patent [19]

Newberry

[11] Patent Number: 4,466,034
[45] Date of Patent: Aug. 14, 1984

[54] CARRIAGE ASSEMBLY

[75] Inventor: Alfred L. Newberry, Moore, Okla.

[73] Assignee: Magnetic Peripherals Inc., Minneapolis, Minn.

[21] Appl. No.: 453,391

[22] Filed: Dec. 27, 1982

[51] Int. Cl.³ .............................................. G11B 21/02
[52] U.S. Cl. ..................................................... 360/106
[58] Field of Search ............................... 360/104–107, 360/86; 74/89.2–89.22, 108; 369/252–254, 39–40

[56] References Cited

U.S. PATENT DOCUMENTS

| | | | |
|---|---|---|---|
| 3,614,333 | 10/1971 | Iwata | 360/86 |
| 3,776,557 | 12/1973 | Rabinow | 369/252 |
| 3,879,754 | 4/1975 | Elliott et al. | 360/99 |
| 3,881,189 | 4/1975 | Mayeda | 360/106 |
| 3,973,272 | 8/1976 | Morgan et al. | 360/86 |
| 4,001,889 | 1/1977 | Schneider | 360/104 |
| 4,114,895 | 9/1978 | Eckhart | 369/253 |
| 4,139,876 | 2/1979 | Owens | 360/97 |
| 4,143,409 | 3/1979 | Iwatuchi et al. | 360/106 |
| 4,163,996 | 8/1979 | Kaseta et al. | 360/97 |
| 4,170,146 | 10/1979 | Owens | 74/89.2 |
| 4,305,104 | 12/1981 | Donahue | 360/106 |
| 4,308,564 | 12/1981 | Thompson | 360/99 |
| 4,310,865 | 1/1982 | Kohl et al. | 360/106 |

OTHER PUBLICATIONS

FIGS. 8-2 and 8-9 comprising assembly diagrams of Control Data's 9406 8" Disk Drive Carriage sold for more than a year before the filing date of the instant application.

Primary Examiner—George G. Stellar
Attorney, Agent, or Firm—Edmund J. Wasp; Joseph A. Genovese

[57] ABSTRACT

A carriage assembly has a carriage frame which supports a transducer for reading and/or writing on a recording medium. The carriage frame is slideably supported upon support members for rectilinear movement with respect to the recording medium. The carriage assembly includes an auxiliary mass slideably supported upon a support rod of a support framework secured to the carriage frame. The auxiliary mass is slideably mounted on the support rod between elastomeric spring dampers disposed at opposite ends of the mass. The carriage assemby is driven by a flexible band which is secured at its ends to the carriage frame and is in wrapped engagement with the drive shaft of a stepper motor. The drive force of the motor is applied to the carriage assembly along a drive axis. The effect of the auxiliary mass and mass support framework is to align the drive axis with the center of mass of the carriage assembly in order to damp carriage vibrations and improve transducer/track alignment.

7 Claims, 2 Drawing Figures

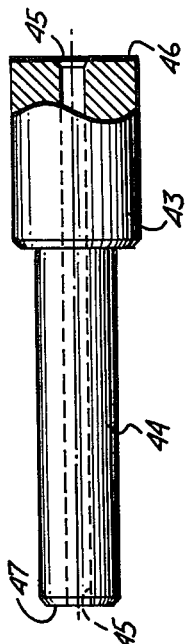
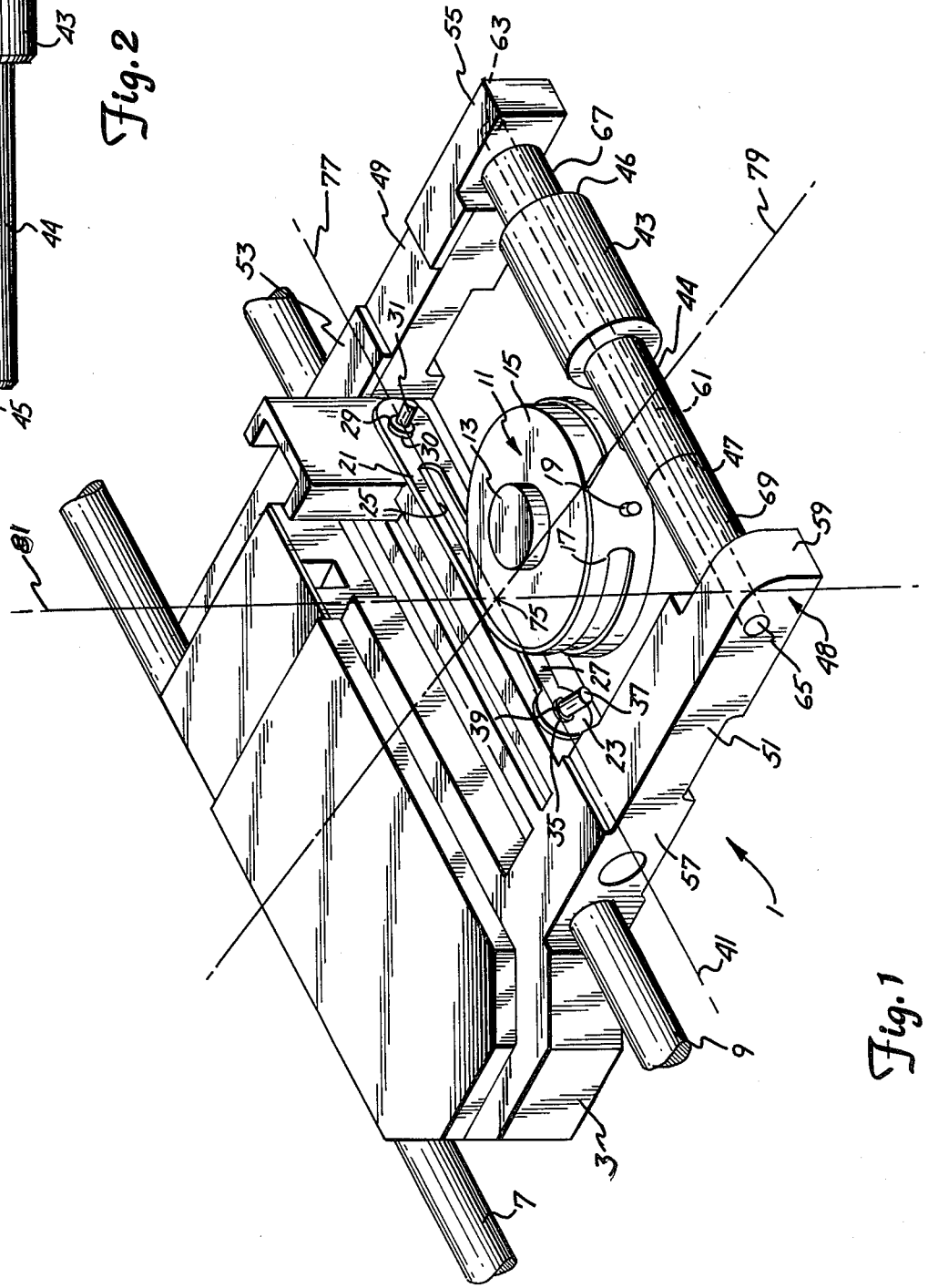

CARRIAGE ASSEMBLY

BACKGROUND

The present invention relates to carriage assemblies supporting transducers for accessing recording mediums, and particularly, to carriage assemblies which are driven off center.

Examples of off center carriage drives are shown in U.S. Pat. Nos. 4,170,146 and 3,881,189. Other examples of prior art devices are shown in U.S. Pat. Nos. 4,310,865; 4,163,996; 4,308,564; 4,305,104; 4,143,409; 3,973,272; 3,879,757; and 4,139,876.

One problem associated with off center carriage drives is that clockwise and counterclockwise torques are applied to the carriage in the plane of the recording medium as the carriage is moved rectilinearly towards and away from the medium by its drive mechanism. These clockwise and counterclockwise torques generate vibrations in the carriage assembly which produce audible noise. Moreover, the rectilinear movement of the carriage, produces longitudinal vibrations in the carriage assembly causing further track/transducer misalignments which must be damped within a specified period of time.

SUMMARY

The present invention overcomes the shortcomings of the prior art by providing a carriage assembly with an auxiliary balancing mass slideably mounted on a supporting framework secured to the carriage frame. The auxiliary mass and framework shift the center of mass of the assembly so that it aligns with the drive axis of the assembly. In addition, the auxiliary mass is slideably mounted on a support rod between elastomeric spring dampers to absorb longitudinal vibrations of the carriage assembly.

It is, therefore, an object of the present invention to provide an improved carriage assembly.

It is a further object to provide a carriage assembly which includes an auxiliary balancing mass to facilitate on center carriage driving.

Still another object is to provide a carriage assembly which includes a mass sliding between spring dampers to absorb longitudinal vibrations in the carriage caused by the rectilinear movement thereof.

Yet another object is to provide a stepper motor driven carriage assembly wherein the drive axis of the stepper motor substantially aligns with the center of mass of the carriage.

Still another object is to provide a carriage assembly wherein carriage vibrations are reduced through a non-critical design which facilitates manufacturing and reduces fabrication costs.

These and other objects, advantages and novel features of the invention will become apparent from the following detailed description of the inventions taken in conjunction with the accompanying drawing.

BRIEF DESCRIPTION OF THE DRAWING

FIG. 1 is a perspective view of the presently preferred embodiment of the invention.

FIG. 2 shows an elevational view of the auxiliary mass of the present invention.

DESCRIPTION OF THE PREFERRED EMBODIMENT

The improved carriage assembly of the present invention is shown in FIG. 1.

While the teachings of the invention are applicable to any carriage assembly which is driven off center, in the presently preferred embodiment the invention is applied to a stepper motor driven carriage assembly.

The carriage assembly 1 has a carriage frame 3, which supports a transducer, or read/write head, (not shown) in the conventional manner. The transducer reads or writes upon selected tracks of a recording medium (not shown). The carriage frame 3 is slideably supported by a pair of parallel support members 7 and 9 for rectilinear movement with respect to the recording medium.

A carriage assembly drive mechanism, comprising a stepper motor 11, is supported adjacent to the carriage frame 3. Stepper motor 11 will not be described in detail in that the use of such motors to drive carriage assemblies is known in the art as is shown by U.S. Pat. Nos. 4,170,146 and 3,881,189. Motor 11 includes a drive shaft 13 and hub 15. A flexible band 17 is in wrapped engagement with the hub 15 and is secured to the hub by a pin 19. Band 17 has a first end 21 and a second end 23. First end 21 has a longitudinal slot 25, and second end 23 has a narrower portion 27 which extends through the slot 25. First end 21 is secured at a first point 29 to carriage frame 3 by a pin 31 which extends through an aperture 33 in end 21. Second end 27 is secured to frame 3 at a second point 35 by a pin 37 which extends through an aperature 39 in second end 27.

The rotary motion of motor hub 15 under servo, or other, control is converted into linear motion of the carriage 1 by band 17. The straight line through the points 29 and 35 defines the linear drive axis 41 of the carriage. As the motor 1 cycles from clockwise to counterclockwise rotation, a rectilinear drive force is applied to carriage 3 along drive axis 41.

We have so far described a fairly conventional prior art carriage and drive assembly as shown by the two referenced patents. A problem with the prior art carriage drives has been that the drive force for the carriage has been applied off center, as noted above. The prior art drive mechanisms have, accordingly, generated clockwise and counterclockwise torques on the carriages in the plane of the recording medium. There is a finite amount of clearance between the support members 7 and 9 and the carriage 3. Hence, the clockwise and counterclockwise torques produced by off center driving has caused torsional vibrations between the carriage and support members 7, 9, generating audible noise and track/transducer misalignments. In addition, the rectilinear motion of the carriage has excited longitudinal vibrations in the carriage, further encouraging track/transducer misalignment and increasing transducer settle time.

The present invention eliminates these and other problems of the prior art by incorporating into assembly 1 an auxiliary mass 43 which is slideably supported upon an auxiliary mass support framework 48 which is secured to the carriage frame 3. The effect of the support framework 48 and mass 43 is to shift the center of mass of the carriage assembly 1 so that the center of mass aligns with the drive axis 41 or motor 11 to eliminate off center driving. In addition, the auxiliary mass damps the longitudinal vibrations of the carriage as will now be more fully described.

Auxiliary mass support framework 48 has a first arm 49 and a second arm 51. Arm 49 is secured at its first end 53 to carrige frame 3 and has a second end 55 opposite thereto. Second arm 51 is secured at its first end 57 to carriage frame 3 and has a second end 59 opposite thereto. The arms 49, 51 are substantially parallel to one another. An auxiliary mass support rod 61 is secured at its first end 63 to end 55 of arm 49, and is secured at its second end 65 to end 59 of arm 51. The rod 61 is perpendicular to the arms 49, 51. As is best shown in FIG. 2, auxiliary mass 43 has a reduced diameter portion 44, and a centrally disposed cylindrical aperture 45 extending from its first end 46 to its oppositely disposed second end 47. As shown in FIG. 1, the auxiliary mass 43 is slideably mounted on the auxiliary mass support rod 61 by means of the cylindrical aperture 45. The reduced diameter portion 44 of mass 43 provides clearance for stepper motor 11 as shown. A first elastomeric spring damper 67 is disposed at the first end 46 of mass 43, and a second elastomeric spring damper 69 is disposed at the second end 47 of mass 43. First spring damper 67 is disposed between first end 46 and first arm 49, while the second spring damper 69 is disposed between second end 47 and second arm 51. Each of the dampers 67, 69 has a centrally disposed cylinrical aperture by means of which it is supported on the rod 65. The auxiliary mass 43 free floats on the rod 61 between these resilient dampers 67 and 69.

The auxiliary mass 43 and support framework 48 (and dampers 67 and 69) are so designed and weighted that the center of mass 75 of the carriage assembly 1 is positioned along drive axis 41. Center of mass 75 is defined by the intersection of the longitudinal axis 77, transverse axis 79 and vertical axis 81 of the carriage assembly 1. The effect of the auxiliary mass 43 and framework 48 is to relocate the center of mass 75 along transverse axis 79 so that the longitudinal axis 77 of center of mass 75 substantially aligns with drive axis 41.

The center of mass of the assembly 1, without the mass 43 framework 48, and dampers 67, 69, can be determined empirically by hanging the carriage on knife edges from different points. Known summation of moments formulations can then be used to determine the necessary size and weight of the mass 43, framework 48 and dampers 67, 69 to substantially align center of mass 75 with drive axis 41. Note, that the instant carriage assembly design is "noncritical" in that it is not necessary that the drive axis 41 be *exactly* aligned with the center of mass assembly 1, but rather, substantial alignment is sufficient to achieve the benefits of the invention. Having accomplished this substantial alignment, the following advantages of the invention will be realized:

In that the drive axis 41 more nearly coincides with the longitudinal axis 77 of center of mass 75, the clockwise and counterclockwise torques previously experienced by the assembly 1 are minimized, and accordingly, the vibrations and audible noise produced thereby are also minimized. A lubricant film is applied between the support members 7 and 9 and the carriage 3 to further minimize audible noise generated between the carriage 3 and support members 7, 9. This lubricant film also serves as a cushion between the support members 7, 9 and the carriage 3 to compensate for any small off-center loading forces which will be generated if the carriage isn't driven precisely through its center of mass. Hence, torsional vibrations are minimized or eliminated. In addition, since the axis of support rod 61 is parallel to drive axis 41, the auxiliary mass 43 reduces longitudinal carriage vibrations by alternately compressing the opposed resilient dampers 67, 69 as the assembly changes direction. As stated previously, the resilient dampers 67, 69, are elastomeric in that they function as both springs and dampers. The dampers 67, 69 must not be too stiff or vibrational energy will not be absorbed, but instead, the weight 43 will become captured between the members 67, 69, and will move in unison with the carriage 3. On the other hand, the dampers 67, 69 must not be too soft, or they will be unable to maintain their physical integrity and may not return to their original shape following compression. The dampers 67, 69, accordingly, have a low spring rate and a low resilience to absorb the substantial portion of the vibrational energy and thereby effectively damp longitudinal vibrations of the carriage. In addition to the foregoing, it is noted that by increasing the overall mass of the carriage assembly 1, its tendency to vibrate is reduced. Taking into account these various aspects of the present invention contributing to the damping of vibrations, the net result is a reduction of audible noise and an improvement in track/transducer alignment time.

Having disclosed the presently preferred embodiment of the invention, many modifications and variations thereof would be obvious to those skilled in the art in view of its teachings. The invention is, therefore, intended to be limited only by the scope of the appended claims.

I claim:

1. In an apparatus including a recording medium and a carriage assembly which supports a transducer, said carriage assembly being slideably supported by at least one support member for rectilinear movement with respect to said recording medium, further including a means for driving said carriage assembly rectilinearly with respect to said recording medium, said carriage assembly further comprising:

an auxiliary mass support framework secured to said carriage assembly, said support framework supporting an auxiliary mass.

2. The apparatus of claim 1, wherein said carriage assembly includes a carriage frame and said support framework comprises a first arm extending said carriage frame and a second arm extending from said carriage frame, and a support rod having a first end secured to said first arm and a second end secured to said second arm, said auxiliary mass being slideably supported on said support rod.

3. The apparatus of claim 2 wherein a first resilient damper is disposed at said first end of said support rod and a second resilient damper is disposed at said second end of said support rod, said auxiliary mass being slideably disposed on said support rod between said first and second resilient dampers.

4. The apparatus of claim 3 wherein said auxiliary mass has an aperture and wherein said support rod is inserted through said aperture, said auxiliary mass being slideably mounted on said support rod by means of said aperture.

5. The apparatus of claim 1 wherein said driving means comprises a stepper motor having flexible band in wrapped engagement therewith, said flexible band being secured to said carriage assembly, whereby rotational movement of said stepper motor imparts linear movement along said drive axis to said carriage assembly.

6. The apparatus of claim 5 wherein said flexible band has a first end and a second end, said first end having a longitudinal slot therein, said second end being narrower and extending through said slot, said first end being secured at a first point to said carriage assembly, and said second end being secured to a second point to said carriage assembly.

7. The apparatus of claim 6 wherein said stepper motor is disposed between said first and second arms, and said mass support rod of said carriage frame.

* * * * *